(12) United States Patent
Yanagi

(10) Patent No.: US 9,743,048 B2
(45) Date of Patent: Aug. 22, 2017

(54) IMAGING APPARATUS, CAMERA UNIT, DISPLAY UNIT, IMAGE-TAKING METHOD, DISPLAY METHOD AND COMPUTER READABLE RECORDING MEDIUM RECORDING PROGRAM THEREON

(71) Applicant: CASIO COMPUTER CO., LTD., Shibuya-ku, Tokyo (JP)

(72) Inventor: Kazunori Yanagi, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 357 days.

(21) Appl. No.: 14/660,577

(22) Filed: Mar. 17, 2015

(65) Prior Publication Data

US 2015/0304574 A1 Oct. 22, 2015

(30) Foreign Application Priority Data

Apr. 16, 2014 (JP) ................... 2014-084502

(51) Int. Cl.
*H04N 7/18* (2006.01)
*H04N 5/232* (2006.01)

(52) U.S. Cl.
CPC ......... *H04N 7/185* (2013.01); *H04N 5/23203* (2013.01)

(58) Field of Classification Search
CPC ............................ H04N 5/23203; H04N 7/185

USPC .......................................................... 348/158
See application file for complete search history.

(56) References Cited

U.S. PATENT DOCUMENTS 7,957,765 B1 * 6/2011 Causey ............... H04M 1/0256
455/550.1
2014/0211031 A1 * 7/2014 Han .................... H04N 5/23222
348/208.99

FOREIGN PATENT DOCUMENTS

JP 07209700 A 8/1995
JP 2004356970 A 12/2004

* cited by examiner

*Primary Examiner* — Sath V Perungavoor
*Assistant Examiner* — Peet Dhillon
(74) *Attorney, Agent, or Firm* — Holtz, Holtz & Volek PC

(57) ABSTRACT

A CPU of a camera unit controls a communication section to transmit live view images captured by an imaging section to a remote control unit. Further, in the case of receiving a rotation angle of the remote control unit (an angle with respect to the horizontal direction of a display surface of a display section of the remote control unit) transmitted from the remote control unit, the CPU sets a trimming frame for an image captured by the imaging section based on the rotation angle. In the case of receiving an image-taking instruction from the remote control unit, the CPU crops the image along a trimming frame at that point of time and stores the cropped image in a recording medium.

19 Claims, 20 Drawing Sheets

IMAGING APPARATUS, CAMERA UNIT, DISPLAY UNIT, IMAGE-TAKING METHOD, DISPLAY METHOD AND COMPUTER READABLE RECORDING MEDIUM RECORDING PROGRAM THEREON

CROSS-REFERENCE TO RELATED APPLICATIONS

This application is based upon and claims the benefit of priority under 35 USC 119 of Japanese Patent Application No. 2014-084502 filed on Apr. 16, 2014, the entire disclosure of which is incorporated herein by reference in its entirety for all purposes.

BACKGROUND OF THE INVENTION

1. Field of the Invention

The present invention relates to an imaging apparatus, a camera unit, a display unit, an image-taking method, a display method, and a computer readable recording medium for recording a program thereon.

2. Description of the Related Art

Conventionally, an image taking method has been suggested for taking a still picture or a moving picture automatically or remotely by using a remote control with a main body of a camera mounted on a user's body (the head part, the main body part, and the like), a pet, a child, or a tree branch or play equipment which is suitable for taking a picture of a subject.

For example, Japanese Patent Application Laid-Open Publication No. 1995-209700 published on Aug. 11, 1995 and Japanese Patent Application Laid-Open Publication No. 2004-356970 published on Dec. 16, 2004 disclose a wearable camera of which main body is mounted on a user's body and comprising a glasses-type separate viewfinder, a camera unit mounted on the chest of the user, and a remote control.

The conventional technology enables the user to take a picture without readying the camera for shooting by making the field of vision of the separate viewfinder follow the camera's photography field of vision.

SUMMARY OF THE INVENTION

According to an embodiment of the present invention, an imaging apparatus is provided which includes a camera unit, and a display unit. The camera unit and the display unit are separate units and communicate with each other. The display unit includes a display section, an acquiring section configured to acquire a rotation angle of the display unit, and a rotation angle transmitting section configured to transmit the rotation angle acquired by the acquiring section to the camera unit by the communication. The camera unit includes an imaging section, a rotation angle receiving section configured to receive the rotation angle transmitted by the rotation angle transmitting section, a setting section configured to set a trimming frame for a live view image captured by the imaging section based on the rotation angle received by the rotation angle receiving section, and a live view image transmitting section configured to transmit the live view image based on the setting by the setting section to the display unit by the communication. The display unit further includes a live view image receiving section configured to receive the live view image transmitted by the live view image transmitting section by the communication, and a display control section configured to control the display section to display the live view image received by the live view image receiving section.

According to an embodiment of the present invention, a camera unit is provided which includes an imaging section, a communication section, a rotation angle receiving section configured to receive a rotation angle from the outside via the communication section, a setting section configured to set a trimming frame for a live view image captured by the imaging section based on the rotation angle received by the rotation angle receiving section, and a live view image transmitting section configured to transmit the live view image based on the setting by the setting section to the outside via the communication section.

According to an embodiment of the present invention, a display unit is provided which includes a display section, an acquiring section configured to acquire a rotation angle of the display unit, a communication section, a rotation angle transmitting section configured to transmit the rotation angle acquired by the acquiring section to an external camera unit via the communication section, a live view image receiving section configured to receive a live view image which is transmitted from the external camera unit and based on a result of setting a trimming frame based on the rotation angle via the communication section, and a display control section configured to control the display section to display the live view image received by the live view image receiving section.

According to an embodiment of the present invention, an imaging method is provided which includes a rotation angle receiving step of receiving a rotation angle transmitted from the outside via a communication section, a setting step of setting a trimming frame for a live view image captured by an imaging section based on the rotation angle received at the rotation angle receiving step, and a live view image transmitting step of transmitting the live view image based on the setting at the setting step to the outside via the communication section.

According to an embodiment of the present invention, a display method is provided which includes an acquiring step of acquiring a rotation angle of a display unit, a rotation angle transmitting step of transmitting the rotation angle acquired at the acquiring step to an external camera unit via a communication section, a live view image receiving step of receiving a live view image which is transmitted from the external camera unit and based on a result of setting a trimming frame based on the rotation angle via the communication section, and a display control step of controlling a display section to display the live view image received at the live view image receiving step.

According to an embodiment of the present invention, a non-transitory computer-readable recording medium for recording a program readable by a computer including an imaging section and a communication section is provided. The program controlling the computer to function as a rotation angle receiving section configured to receive a rotation angle from the outside via the communication section, a setting section configured to set a trimming frame for a live view image captured by the imaging section based on the rotation angle received by the rotation angle receiving section, and a live view image transmitting section configured to transmit the live view image based on the setting by the setting section to the outside via the communication section.

According to an embodiment of the present invention, a non-transitory computer-readable recording medium for recording a program readable by a computer including a display section and a communication section is provided.

The program controlling the computer to function as an acquiring section configured to acquire a rotation angle thereof, a rotation angle transmitting section configured to transmit the rotation angle acquired by the acquiring section to an external camera unit via the communication section, a live view image receiving section configured to receive a live view image which is transmitted from the external camera unit and based on a result of setting a trimming frame based on the rotation angle via the communication section, and a display control section configured to control the display section to display the live view image received by the live view image receiving section.

BRIEF DESCRIPTION OF THE DRAWINGS

The present invention will more sufficiently be understood by the following detailed description and the accompanying drawings, which are, however, exclusively for explanation and do not limit the scope of the present invention.

Here.

DETAILED DESCRIPTION OF THE PREFERRED EMBODIMENT

Hereinafter, embodiments of the present invention will be described with reference to the accompanying drawings.

A. First Embodiment

First, a first embodiment of the present invention is explained.

Figure 1:
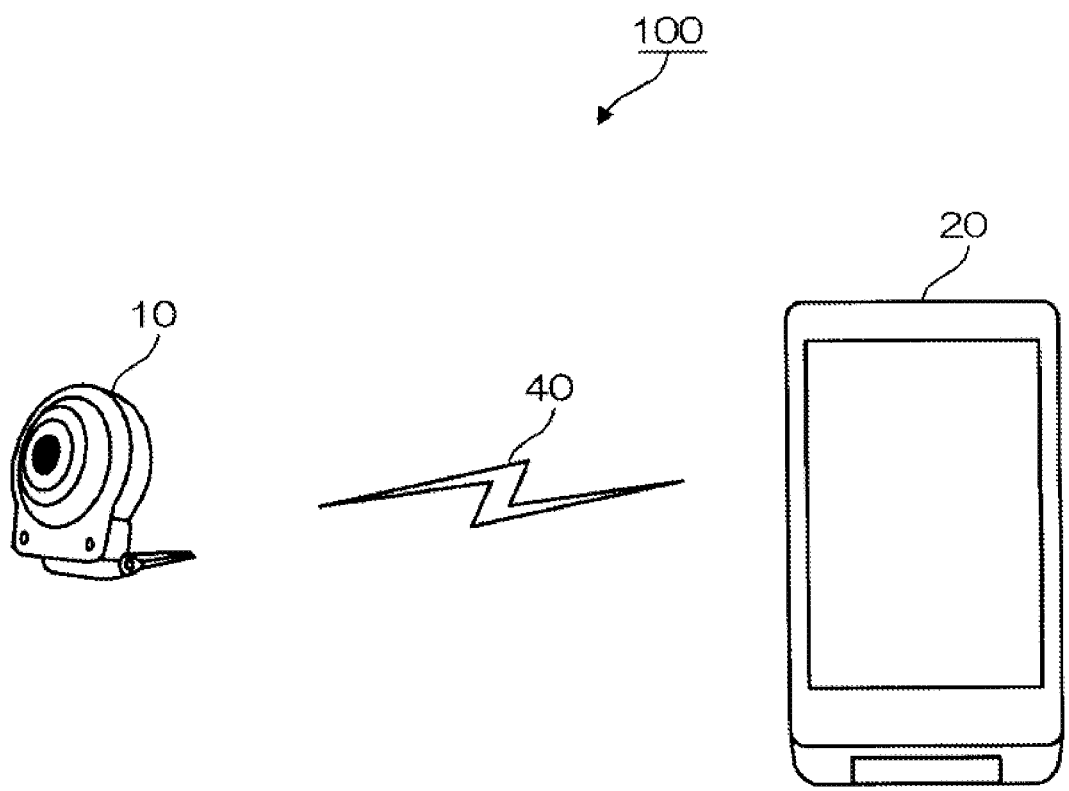
FIG. 1 is a schematic diagram showing a configuration of an imaging apparatus 100 according to a first embodiment of the present invention.

FIG. 1 is a schematic diagram showing a configuration of an imaging apparatus 100 according to the first embodiment of the present invention.

The imaging apparatus 100 shown in FIG. 1 consists of a camera unit 10 (a camera part) and a remote control unit 20 (a remote control part).

For example, the camera unit 10 includes a digital camera having an imaging function and the remote control unit 20 includes a dedicated device, a smart phone, a tablet terminal, or the like. Each of the camera unit 10 and the remote control unit 20 establishes pairing (wireless connection recognition) by using available wireless communication 40.

The wireless communication 40 includes wireless LAN (WiFi), Bluetooth (Registered Trademark), or the like.

The camera unit 10 is mounted on a user's body (the head part, the main body part, and the like), a pet, or a child, or installed on a tree branch or play equipment which is suitable for taking a picture of a subject.

At this time, it is unnecessary to level the camera unit 10.

The remote control unit 20 remotely controls the camera unit 10 via the wireless communication 40 by using a launched application (program) dedicated to operation of the camera.

The remote control includes start of image-taking, stop of image-taking, setting of operation modes, zooming, setting of image-taking conditions, browsing of taken images (taken moving-pictures), and the like.

Figure 2A:
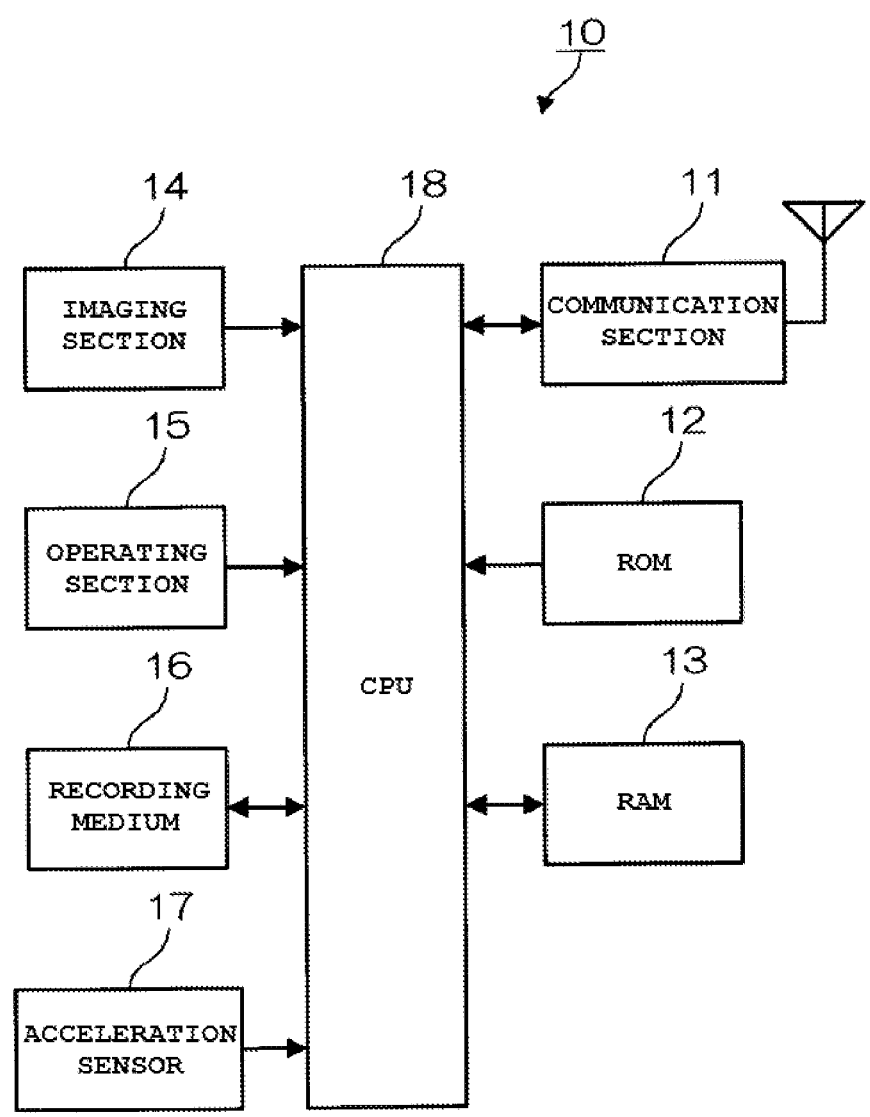
FIG. 2A is a block diagram showing a configuration of a camera unit 10 of the imaging apparatus 100 according to the first embodiment of the present invention.
Figure 2B:
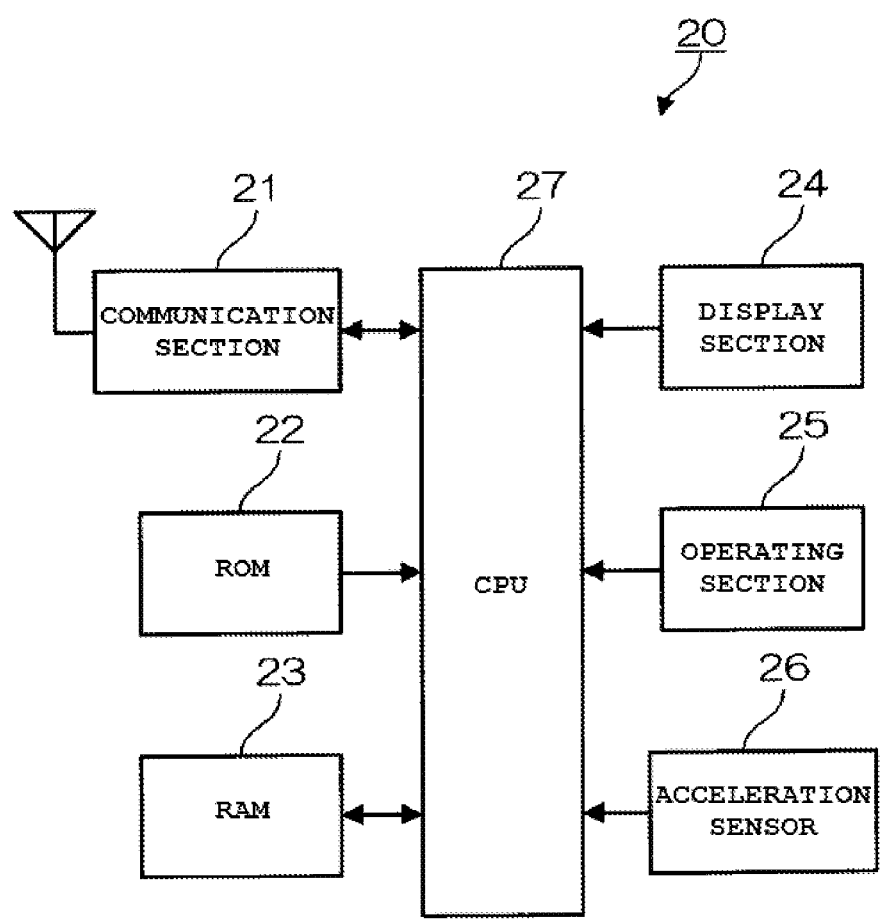
FIG. 2B is a block diagram showing a configuration of a remote control unit 20 of the imaging apparatus 100 according to the first embodiment of the present invention.

FIG. 2A is a block diagram showing a configuration of the camera unit 10 according to the first embodiment of the present invention. FIG. 2B is a block diagram showing a configuration of the remote control unit 20 according to the first embodiment of the present invention.

In FIG. 2A, the camera unit 10 includes a communication section 11, a ROM (Read Only Memory) 12, a RAM (Random Access Memory) 13, am imaging section 14, an operating section 15, a recording medium 16, an acceleration sensor 17, and a CPU (Central Processing Unit) 18.

The communication section 11 connects to the remote control unit 20 via the wireless communication 40, and, transmits a live view image to the remote control unit 20 and/or receives an operation instruction from the remote control unit 20.

In the ROM 12, there are stored programs to be executed by the CPU 18, various parameters which are necessary for operations described later, and the like.

The RAM 13 is used as a buffer memory in which data of images captured by the imaging section 14 is stored temporarily as well as a working memory when the CPU 18 described later executed a program.

The imaging section 14 includes a lens block consisting of a group of optical lenses and an imaging element such as a CCD or a CMOS, and converts an image input from the lens block to digital signals by the imaging element and outputs the signals.

The operating section 15 includes basic operation keys such as a power switch, a mode key, or the like, and outputs an operation signal according to the user's key manipulation.

In the recording medium 16, data of image captured by the imaging section 14 and the like are stored.

The acceleration sensor 17 detects rotation angles in three-axis directions of the camera unit.

The CPU 18 controls operations of each section by executing programs stored in the ROM 12.

In particular, according to the first embodiment, the CPU 18 controls the communication section 11 to transmit live view images captured by the imaging section 14 to the remote control unit 20 whenever necessary.

Further, in the case of receiving a rotation angle of the remote control unit 20 (an angle with respect to the horizontal direction of a display surface of a display section 24 of the remote control unit 20) transmitted by the remote control unit 20, the CPU 18 sets a trimming frame for an image captured by the imaging section 14 based on the rotation angle. Further, in the case of receiving an image-taking instruction from the remote control unit 20, the CPU 18 crops the taken image along a trimming frame at that point of time and stores the image in the recording medium 16 (as will be described in detail below).

In FIG. 2B, the remote control unit 20 includes a communication section 21, a ROM 22, a RAM 23, a display section 24, an operating section 25, an acceleration sensor 26, and a CPU 27.

The communication section 21 connects to the camera unit 10 via the wireless communication 40 and transmits/receives various data.

In the ROM 22, there are stored programs to be executed by the CPU 27, various parameters which are necessary for operations described later, and the like.

In the RAM 23, there are stored temporary data when the CPU 27, which will be described later, executes a program, various application programs, and data such as various parameters which are necessary for execution of application programs.

The display section 24 includes a liquid crystal display device, an organic EL (Electro Luminescence) display device, or the like, and displays various menus, a live view image, data of an image captured by the camera unit 10, or the like. The operating section 25 includes a mechanical switch such as a power button or a sound volume button, a touch panel for detecting direct contact of a finger or a stylus (pen) or proximity of a manipulation tool such as a finger, and the like.

The acceleration sensor 26 detects movement of the remote control unit 20, in particular, a rotation angle (an angle with respect to the horizontal direction of the display surface of the display section 24).

The CPU 27 acquires the rotation angle of the remote control unit 20 from the acceleration sensor 26.

The CPU 27 controls operations of each section by executing programs stored in the ROM 22.

In particular, according to the first embodiment, in the case communication between the camera unit 10 and the remote control unit 20 is established, the CPU 27 receives a live view image transmitted from the camera unit 10 and controls the display section 24 to display the live view image.

Further, the CPU 27 transmits the rotation angle (the angle with respect to the horizontal direction of the display surface of the display section 24) acquired from the acceleration sensor 26 to the camera unit 10 via the communication section 21 whenever necessary.

In addition, in the case that the user performs image-taking operation (corresponding to a shutter press) through the operating section 25, the CPU 27 transmits an image-taking instruction signal to the camera unit 10 via the communication section 21.

Figure 3A:
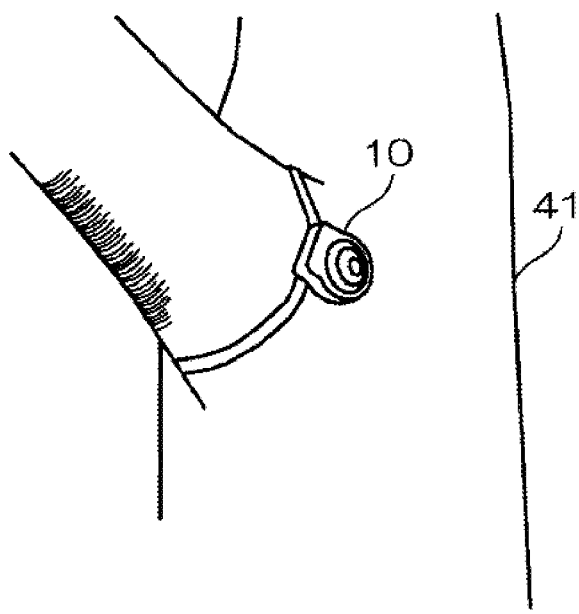
FIG. 3A illustrates an example of mounting of the camera unit 10 according to the first embodiment of the present invention.
Figure 3B:
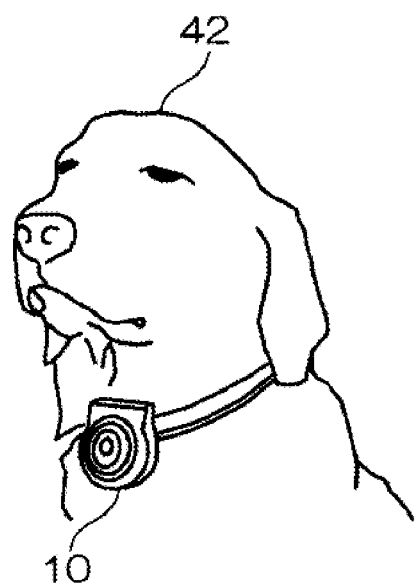
FIG. 3B illustrates another example of mounting of the camera unit 10 according to the first embodiment of the present invention.
Figure 3C:
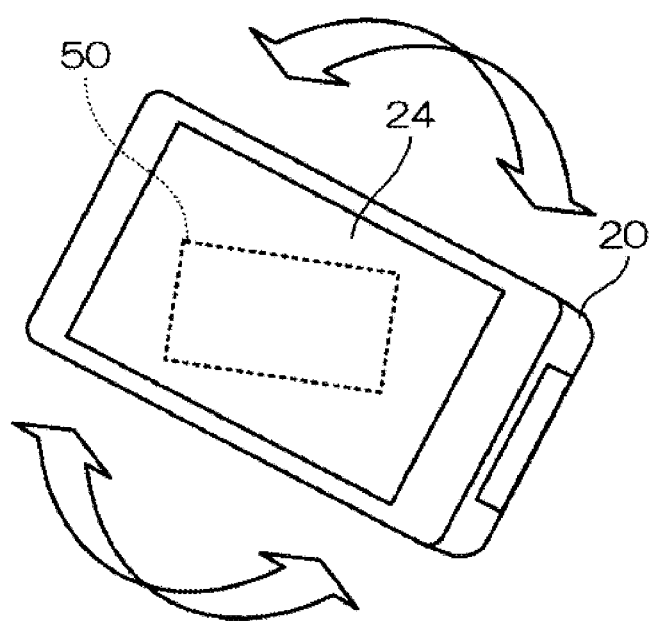
FIG. 3C illustrates an example of manipulation of the remote control unit 20 according to the first embodiment of the present invention.

FIGS. 3A and 3B illustrate examples of mounting of the camera unit 10 according to the first embodiment of the present invention. FIG. 3C illustrates an example of manipulation of the remote control unit 20 according to the first embodiment of the present invention.

As described above, it is difficult to install the camera unit 10 horizontally due to an object such as a pet on which it is mounted and thus the camera unit 10 slants no matter what.

For example, in the case that the camera unit 10 is installed on a branch of a tree 41 in a park as shown in FIG. 3A or mounted on an animal (a collar of a dog 42) as shown in FIG. 3B, it is difficult to install the camera unit 10 horizontally.

Thus, if the camera unit 10 performs image-taking as it stands, an image obliquely tilting is captured and it is difficult to take an image in which a subject is in the horizontal direction with respect to the downward vertical (gravity) direction (hereinafter, referred to as a "desired image").

According to the first embodiment of the present invention, the display section 24 of the remote control unit 20 displays a live view image (not shown in the present drawing) along with a trimming frame 50 which rotates according to the rotation angle of the remote control unit 20 (the angle with respect to the horizontal direction of the display surface of the display section 24) as shown in FIG. 3C.

The trimming frame 50 displayed by the remote control unit 20 rotates in real time according to the rotation angle of the remote control unit 20.

As the trimming frame 50 indicates an image area to be stored as a captured image, the user can be aware of what image will be captured by visually recognizing relationships between the live view image and the trimming frame 50.

Thus, while looking at the live view image and the trimming frame 50 displayed by the display section 24 of the remote control unit 20 as shown in FIG. 3C, the user rotates the remote control unit 20 and performs an image-taking operation (corresponding to a shutter press) when the trimming frame 50 rotates by a desired angle.

The camera unit 10 sets a rotation angle of a trimming frame (similar to the trimming frame 50) which rotates according to the rotation angle transmitted from the remote control unit 20.

Further, in the case of receiving an image-capturing instruction from the remote control unit 20, the camera unit 10 captures an image by using the imaging section 14 and trims the captured image along the trimming frame at that point of time to store the trimmed image in the recording medium 16.

As described above, according to the first embodiment of the present invention, the user rotates the remote control unit 20 clockwise or counterclockwise while looking at the live view image and the trimming frame 50 displayed by the display section 24 of the remote control unit 20 and performs an image-taking operation (corresponding to a shutter press) when the trimming frame 50 is at a desired rotation angle.

As a result, it is possible to capture a desired image without adjusting the state of installing the camera unit 10.

Now, operations of the first embodiment are described.

Figure 4:
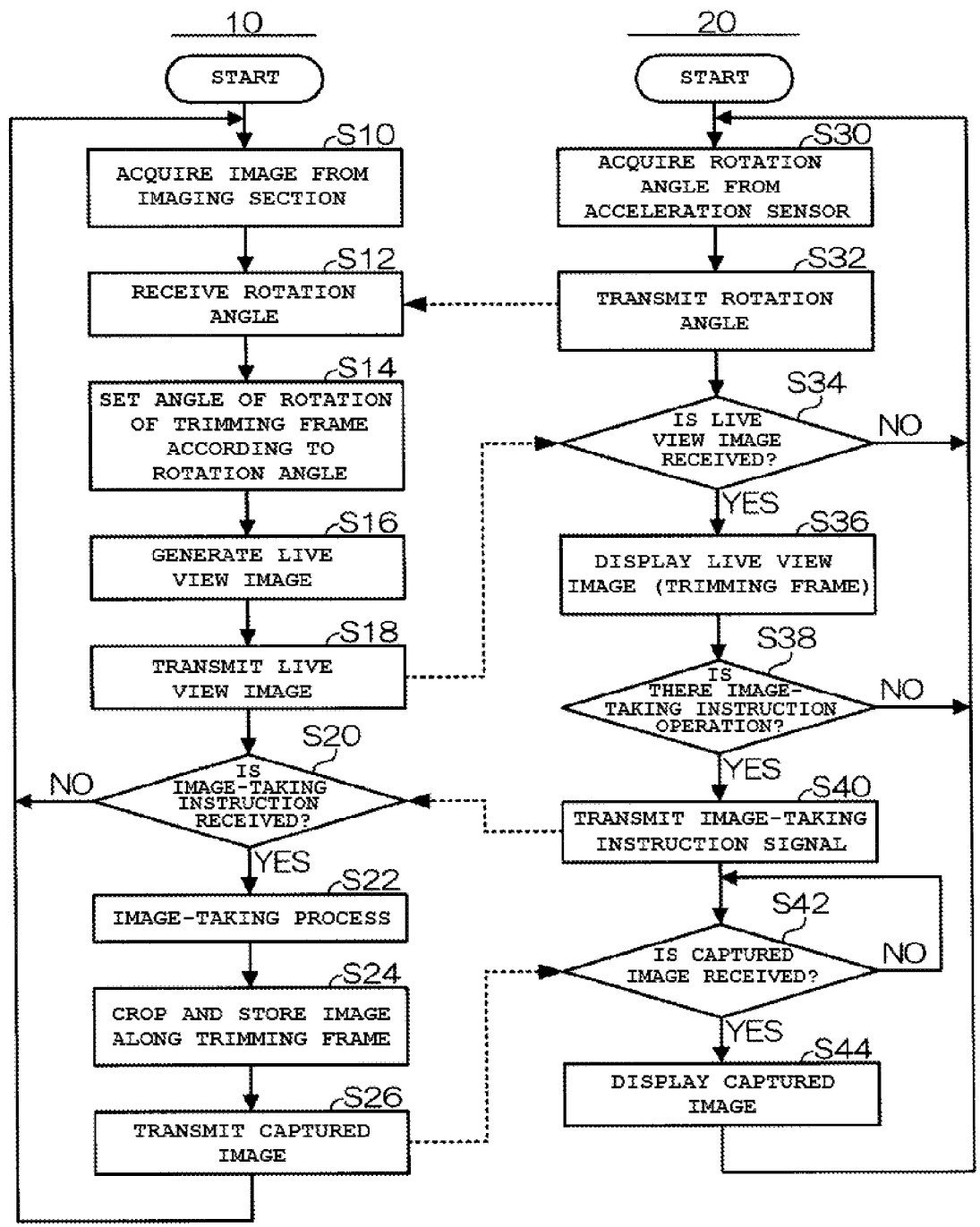
FIG. 4 is a flow chart for explaining operations of the camera unit 10 and the remote control unit 20 according to the first embodiment of the present invention.

FIG. 4 is a flow chart for explaining operations of the camera unit 10 and the remote control unit 20 according to the first embodiment of the present invention.

<Camera Unit 10>

In the camera unit 10, the CPU 18 acquires an image from the imaging section 14 (Step S10) and receives a rotation angle RA of the remote control unit 20 via the communication section 11 (Step S12).

Then, the CPU 18 sets a rotation angle TA of a trimming frame according to the received rotation angle RA of the remote control unit 20 (Step S14).

For example, if the rotation angle RA of the remote control unit 20 is 10°, the rotation angle TA of the trimming frame for the image is set to 10°.

Then, the CPU 18 generates a live view image LI from the image acquired from the imaging section 14 and the set trimming frame (Step S16), and transmits the live view image LI to the remote control unit 20 via the communication section 11 (Step S18).

The live view image LI includes the image acquired from the imaging section 14 (the image after reduction and/or thinning processing) and the trimming frame superposed onto the image.

Next, the CPU 18 determines whether or not an image-taking instruction signal (capture command signal) CC is received from the remote control unit 20 (Step S20).

In the case that the CPU 18 determines that no image-taking instruction signal CC is received from the remote control unit 20 ("NO" at Step S20), the process returns to Step S10 and the steps of receiving the rotation angle RA from the remote control unit 20, setting of the trimming frame and generating/transmitting the live view image LI are repeated.

In the case that the CPU 18 determines that the image-taking instruction signal CC is received from the remote control unit 20 ("YES" at Step S20), it performs an image-taking process to acquire an image by using the imaging section 14 according to predetermined shooting parameters (Step S22).

Then, the CPU 18 crops the acquired image along the trimming frame at that point of time and stores the cropped image as a final captured image CI in the recording medium 16 (Step S24).

Then, the CPU 18 transmits the final captured image CI to the remote control unit 20 via the communication section 11 (Step S26).

At this step, processing such as reduction or thinning may be performed for the final captured image CI as necessary.

After that, the process returns to Step S10 and the above steps are repeated.

<Remote Control Unit 20>

In the remote control unit 20, the CPU 27 acquires the rotation angle RA from the acceleration sensor 26 (Step S30) and transmits the rotation angle RA of the remote control unit 20 to the camera unit 10 via the communication section 21 (Step S32).

Then, the CPU 27 determines whether or not the live view image LI is received from the camera unit 10 (Step S34).

In the case that the CPU 27 determines that no live view image LI is received ("NO" at Step S34), the process returns to S30 and the steps of detecting and transmitting the rotation angle RA of the remote control unit 20 are repeated.

In the case that the CPU 27 determines that the live view image LI is received from the camera unit 10 ("YES" at Step S34), the CPU 27 controls the display section 24 to display the live view image LI (Step S36).

The display section 24 displays the image acquired from the camera unit 10 (the image after reduction and/or thinning processing) and the trimming frame 50 superposed onto the image.

In other words, the display section 24 of the remote control unit 20 displays an image of the total field of view taken by the camera unit 10 and the trimming frame 50 rotating in real time according to the rotation angle RA of the remote control unit 20 as the live view image LI.

The user performs an image-taking instruction operation when the trimming frame is at a desired angle by rotating the trimming frame 50 by rotating the remote control unit 20 while looking at the live view image LI and the trimming frame 50 which are being displayed by the display section 24 of the remote control unit 20.

Next, the CPU 27 determines whether or not an image-taking instruction operation is input (for example, the shutter is pressed) by the user through the operating section 25 (Step S38).

In the case that the CPU 27 determines that there is no image-taking instruction operation ("NO" at Step S38), the process returns to Step S30 and the steps of acquiring and transmitting the rotation angle RA of the remote control unit 20 and displaying the live view image LI are repeated.

In the case that the CPU 27 determines that there is the image-taking instruction operation ("YES" at Step S38), the CPU 27 transmits the image-taking instruction signal CC to the camera unit 10 via the communication section 21 (Step S40).

Next, the CPU 27 determines whether or not the captured image CI is received from the camera unit 10 (Step S42).

Then, the process stands by until the captured image CI is received from the camera unit 10 ("NO" at Step S42). In the case that it is determined that the captured image CI is received ("YES" at Step S42), the CPU 27 controls the display section 24 to display the received captured image CI (the image after reduction and/or thinning processing) (Step S44).

After that, the process returns to Step 30 and the above described steps are repeated.

Figure 5A:
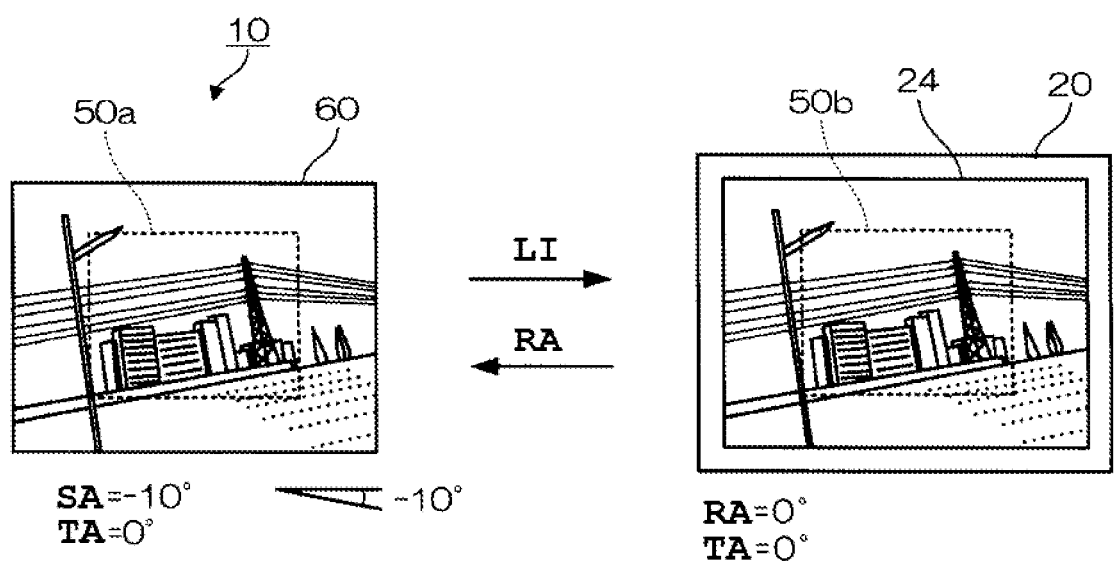
FIG. 5A is a schematic diagram showing an example of an image captured by the camera unit 10 and an example of display performed by the remote control unit 20 according to the first embodiment of the present invention.
Figure 5B:
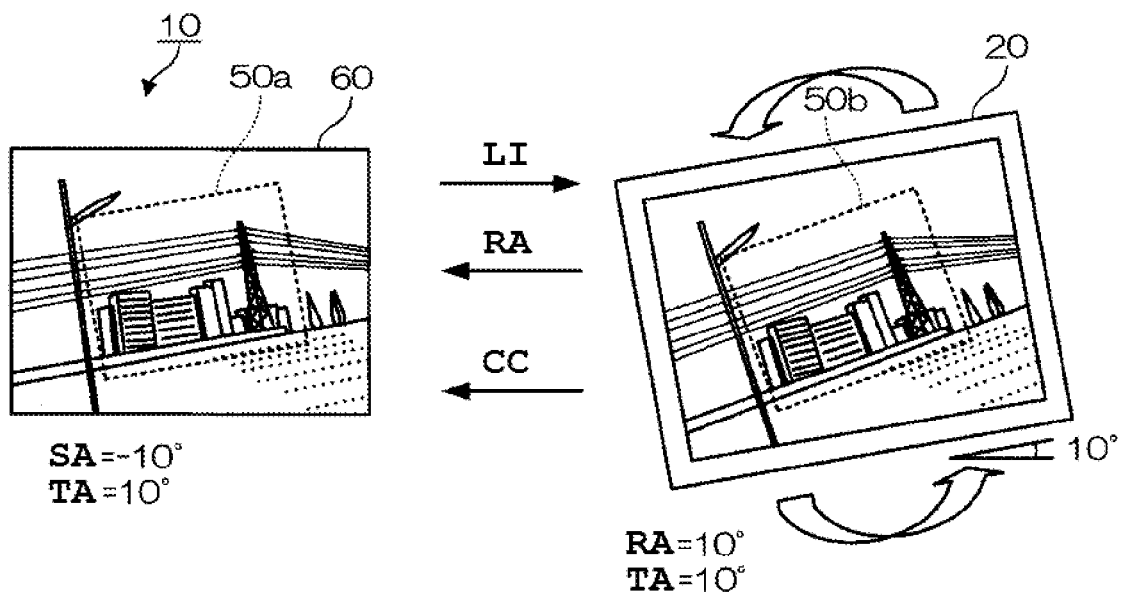
FIG. 5B is a schematic diagram showing an example of an image captured by the camera unit 10 and an example of display performed by the remote control unit 20 according to the first embodiment of the present invention.
Figure 5C:
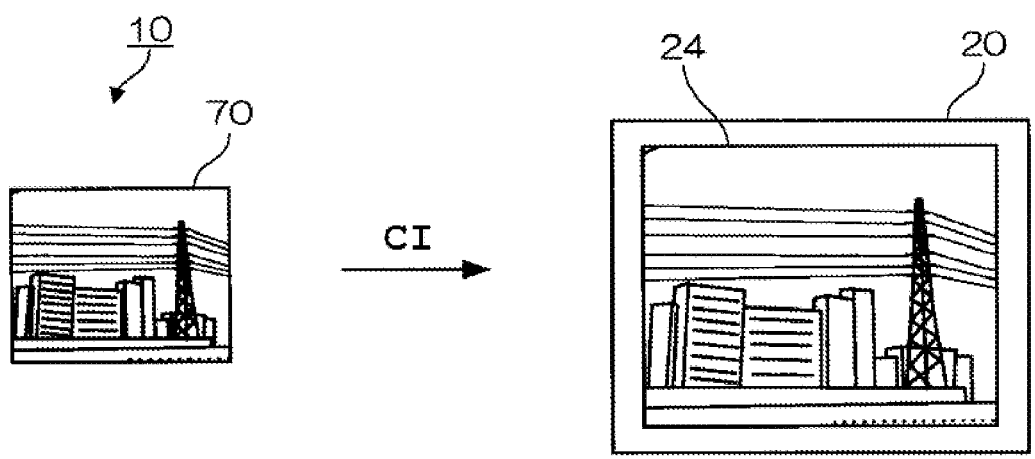
FIG. 5C is a schematic diagram showing an example of an image captured by the camera unit 10 and an example of display performed by the remote control unit 20 according to the first embodiment of the present invention.

Each of FIGS. 5A, 5B and 5C is a schematic diagram showing an example of an image captured by the camera unit 10 and an example of display performed by the remote control unit 20 according to the first embodiment of the present invention.

As shown in FIG. 5A, the camera unit 10 is installed on the slant of an angle of 10° clockwise (−10°).

By this, a captured image 60 acquired by the camera unit 10 tilts by an angle of 10° counterclockwise.

Therefore, as shown in FIG. 5A, the display section 24 of the remote control unit 20 also displays a live view image LI tilting by 10°.

As a rotation angle RA of the remote control unit 20 is transmitted to the camera unit 10, a rotation angle TA of the trimming frame 50a of the camera unit 10 is 0° with respect to the captured image 60 in the case that the rotation angle RA of the remote control unit 20 is 0°.

In this case, a rotation angle TA of a trimming frame 50b displayed on the live view image LI in the remote control unit 20 is also 0° with respect to the main body of the remote control unit 20.

The user rotates the remote control unit 20 so that the rotation angle TA of the trimming frame 50b becomes a desired angle while looking at the live view image LI and the trimming frame 50b displayed by the display section 24 of the remote control unit 20.

For example, as shown in FIG. 5B, the user rotates the remote control unit 20 counterclockwise by 10° so that the rotation angle TA of the trimming frame 50b of the remote control unit 20 becomes equal to the horizontal component of the live view image LI.

In this case, the trimming frame 50a of the camera unit 10 rotates counterclockwise by 10° in real time in response to the rotation angle RA of the remote control unit 20. Similarly, the trimming frame 50b of the remote control unit 10 rotates counterclockwise by 10°.

Further, in the case that the user performs an image-taking instruction operation (corresponding to a shutter press) when the rotation angle TA of the trimming frame 50b becomes a desired angle as shown in FIG. 5B, the camera unit 10 crops the captured image 60 based on the trimming frame 50a as shown in FIGS. 5B and 5C and stores the cropped image as a final captured image 70 in the recording medium 16.

In the remote control unit 20, the display section 24 performs full-screen display (enlarged display) of the captured image 70 received from the camera unit 10 (CI in FIG. 5C).

In the imaging apparatus 100 in which the camera unit 10 and the remote control unit 20 are used separately according to the above described first embodiment of the present invention, the trimming frame 50 (50b) for trimming photography by the camera unit 10 is set in real time based on the rotation angle RA acquired from the acceleration sensor 26 of the remote control unit 20. Thus, regardless of a state of mounting the camera unit 10 (or an installation angle of the camera unit 10) or without adjusting the state of mounting (or the installation angle), it is possible to take a picture at a desired angle.

Further, according to the above described first embodiment, the user can easily visually recognize an angle at which the camera unit 10 takes an image and the trimming frame 50 (50b) for trimming photography because the display section 24 of the remote control unit 20 displays the image acquired by the camera unit 10 along with the trimming frame 50 (50b).

In addition, although the above described first embodiment is configured to transmit the live view image LI generated by superposing the trimming frame 50 (50b) onto an image captured by the camera unit 10 to the remote control unit 20, the present invention is not limited to this configuration. In some embodiments, the remote control unit 20 may generate the live view image LI by superposing the trimming frame 50 (50b) onto an image received from the camera unit 10 based on the rotation angle RA of the remote control unit 20.

B. Second Embodiment

Next, a second embodiment of the present invention is explained.

The first embodiment described above is configured to display the trimming frame 50 (50b) along with an image acquired by the camera unit 10 as the live view image LI on the display section 24 of the remote control unit 20.

On the other hand, according to the second embodiment of the present invention, the camera unit 10 generates a live view image LI by trimming an image along a trimming frame set according to the rotation angle RA of the remote control unit 20 and the remote control unit 20 displays the live view image LI which has been already trimmed.

The user can take a picture at a desired angle according to the live view image LI displayed by the display section 24 of the remote control unit 20 without being aware of the trimming frame.

As the configurations of the camera unit 10 and the remote control unit 20 are the same as those of FIGS. 2A and 2B, explanations of them are omitted.

Now, operations of the second embodiment are described.

Figure 6:
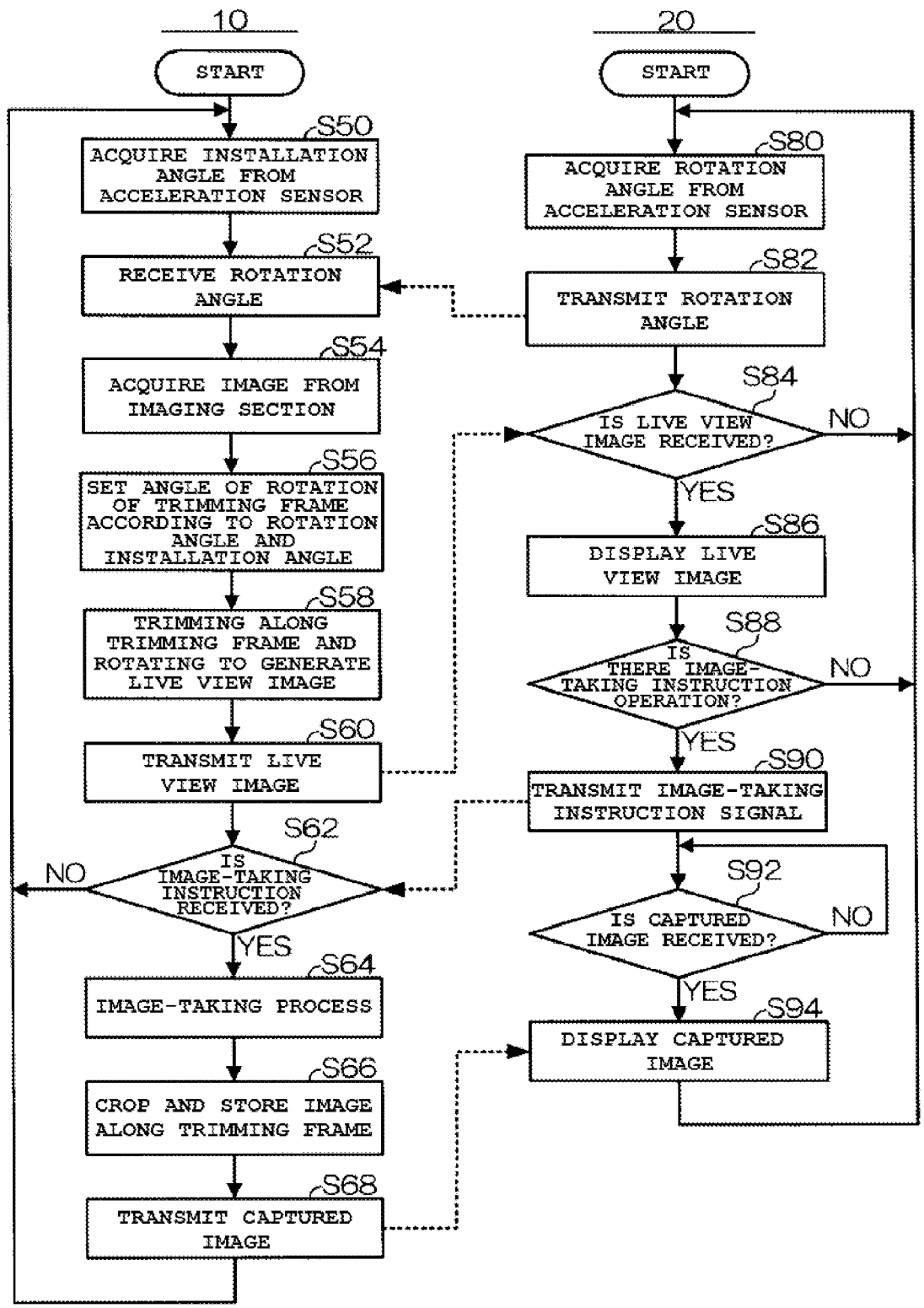
FIG. 6 is a flow chart for explaining operations of the camera unit 10 and the remote control unit 20 according to a second embodiment of the present invention.

FIG. 6 is a flow chart for explaining operations of the camera unit 10 and the remote control unit 20 according to a second embodiment of the present invention.

<Camera Unit 10>

In the camera unit 10, the CPU 18 acquires a slanted angle SA with respect to the horizontal direction from the acceleration sensor 17 first (Step S50) and acquires a rotation angle RA from the remote control unit 20 via the communication section 11 (Step S52).

Then, the CPU 18 acquires an image from the imaging section 14 (Step S54) and sets a rotation angle TA of a trimming frame according to the slanted angle SA and the rotation angle RA (Step S56).

For example, in the case that the slanted angle SA of the camera unit 10 is 10° clockwise and the rotation angle RA of the remote control unit 20 is 0°, the rotation angle TA of the trimming frame for a captured image is set based on the difference between the slanted angle SA and the rotation angle RA, i.e. 0°−(−10°)=10°.

Next, the CPU 18 generates a live view image LI by trimming the image acquired by the imaging section 14 at the set rotation angle of the trimming frame and rotating the trimmed image (Step S58).

Then, the CPU 18 transmits the live view image LI to the remote control unit 20 via the communication section 11 (Step S60).

In other words, the live view image LI is an image trimmed at the rotation angle TA of the trimming frame set in accordance with the difference between the slanted angle SA of the camera unit 10 and the rotation angle RA of the remote control unit 20.

Next, the CPU 18 determines whether or not an image-taking instruction signal (capture command signal) CC, which is transmitted by the remote control unit 20 in the case of detecting an image-taking instruction operation, is received (Step S62).

In the case that the CPU 18 determines that no image-taking instruction signal CC is received ("NO" at Step S62), the process returns to Step S50 and the CPU 18 repeats the steps of acquiring the slanted angle SA from the acceleration sensor 17, receiving the rotation angle RA from the remote control unit 20, setting the rotation angle TA of the trimming frame, and generating and transmitting the live view image LI.

In the case that the CPU 18 determines that the image-taking instruction signal CC is received from the remote control unit 20 ("YES" at Step S62), the CPU 18 performs an image-taking process for acquiring an image by the imaging section 14 according to predetermined shooting parameters (Step S64).

Then, the CPU 18 crops the captured image along the trimming frame at that point of time and stores the cropped image as a final captured image in the recording medium 16 (Step S66).

Next, the CPU 18 transmits the final captured image CI to the remote control unit 20 via the communication section 11 (Step S68). At this step, processing such as reduction or thinning may be performed for the final captured image CI as necessary. After that, the process returns to Step S50 and the above steps are repeated.

<Remote Control Unit 20>

In the remote control unit 20, the CPU 27 acquires the rotation angle RA from the acceleration sensor 26 (Step S80) and transmits the rotation angle RA of the remote control unit 20 to the camera unit 10 via the communication section 21 (Step S82). Then, the CPU 27 determines whether or not the live view image LI is received from the camera unit 10 (Step S84). In the case that the CPU 27 determines that no live view image LI is received ("NO" at Step S84), the process returns to S80 and the steps of acquiring and transmitting the rotation angle RA of the remote control unit 20 are repeated.

In the case that the CPU 27 determines that the live view image LI is received from the camera unit 10 ("YES" at Step S84), the CPU 27 controls the display section 24 to display the live view image LI (Step S86). The display section 24 performs full-screen display of the image acquired by the camera unit 10 (after reduction and/or thinning processing) and cropped along the trimming frame 50 as the live view image LI.

In other words, the display section 24 of the remote control unit 20 displays the live view image LI which is already trimmed by the camera unit 10 along the trimming frame rotating in real time according to the rotation angle RA of the remote control unit 20.

The user performs the image-taking instruction operation when the live view image LI is at a desired angle by rotating the remote control unit 20 while looking at the live view image LI which is being displayed by the display section 24 of the remote control unit 20.

Next, the CPU 27 determines whether or not an image-taking instruction operation is input (for example, the shutter is pressed) by the user through the operating section 25 (Step S88). In the case that the CPU 27 determines that there is no image-taking instruction operation ("NO" at Step S88), the process returns to Step S80 and the steps of acquiring and transmitting the rotation angle RA of the remote control unit 20 and displaying the live view image LI are repeated.

In the case that the CPU 27 determines that there is the image-taking instruction operation of the user ("YES" at Step S88), the CPU 27 transmits the image-taking instruction signal CC to the camera unit 10 via the communication section 21 (Step S90). Next, the CPU 27 determines whether or not the captured image CI is received from the camera unit 10 (Step S92). Then, the process stands by until the captured image CI is received from the camera unit 10 ("NO" at Step S92). In the case that it is determined that the captured image CI is received ("YES" at Step S92), the CPU 27 controls the display section 24 to display the received captured image CI (the image after reduction and/or thinning processing) (Step S94).

After that, the process returns to Step 80 and the above described steps are repeated.

Figure 7A:
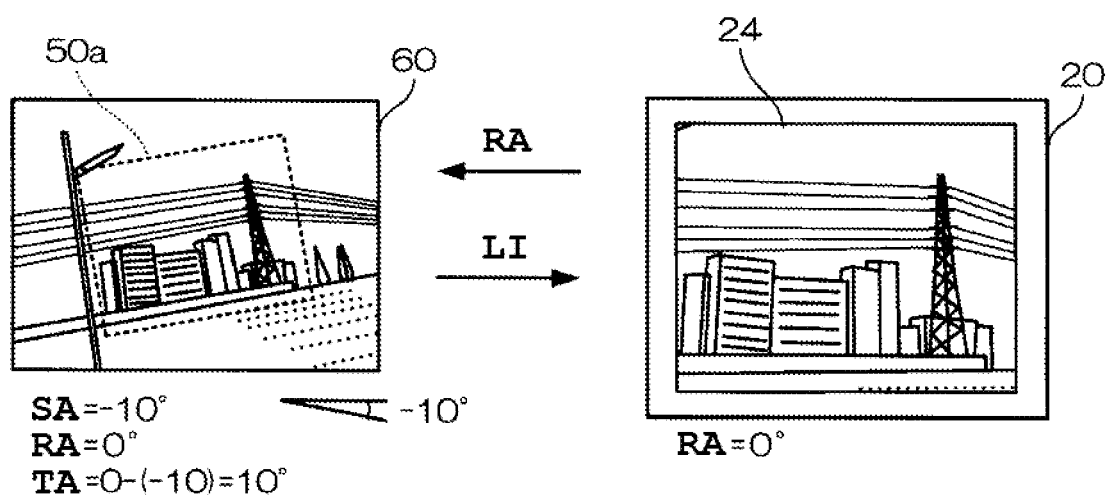
FIG. 7A is a schematic diagram showing an example of an image captured by the camera unit 10 and an example of display performed by the remote control unit 20 according to the second embodiment of the present invention.
Figure 7B:
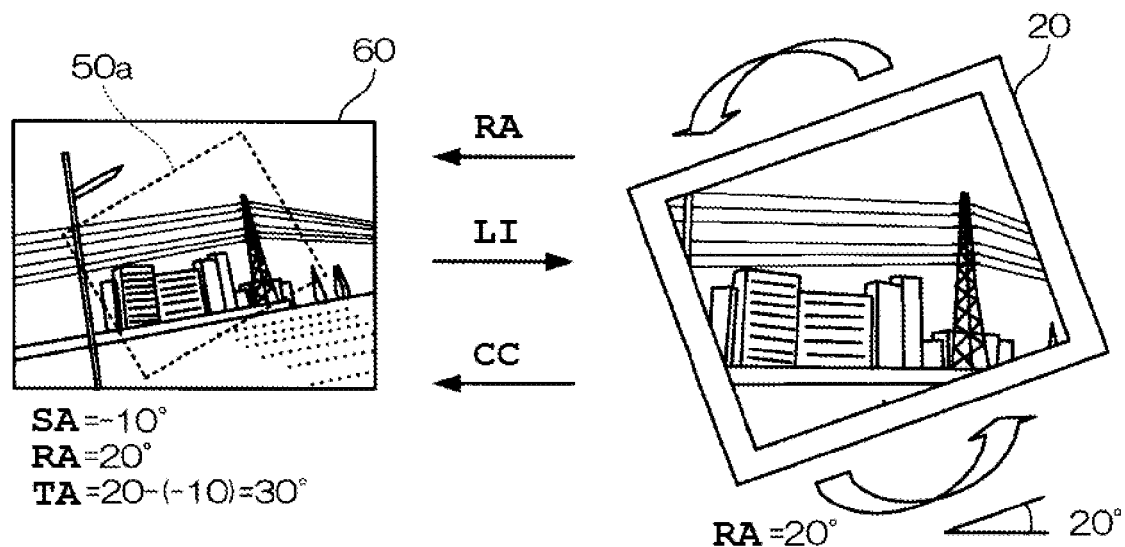
FIG. 7B is a schematic diagram showing an example of an image captured by the camera unit 10 and an example of display performed by the remote control unit 20 according to the second embodiment of the present invention.
Figure 7C:
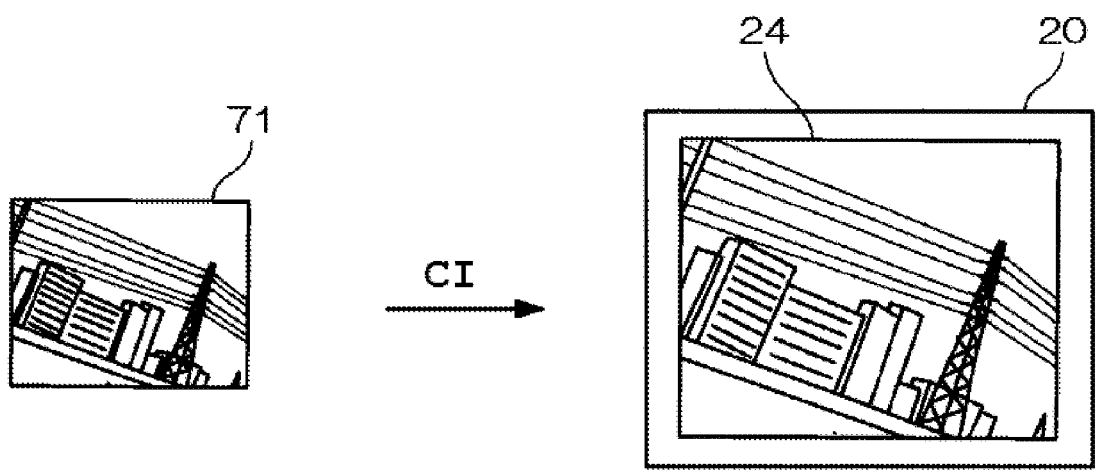
FIG. 7C is a schematic diagram showing an example of an image captured by the camera unit 10 and an example of display performed by the remote control unit 20 according to the second embodiment of the present invention.

Each of FIGS. 7A, 7B and 7C is a schematic diagram showing an example of an image captured by the camera unit 10 and an example of display performed by the remote control unit 20 according to the second embodiment of the present invention.

As shown in FIG. 7A, the camera unit 10 is installed on the slant of an angle of 10° clockwise (−10°).

By this, a captured image 60 acquired by the camera unit 10 tilts by an angle of 10° counterclockwise.

For example, in the case that the rotation angle RA of the remote control unit 20 is 0°, the rotation angle TA of the trimming frame 50a of the camera unit 10 is set to 0°−(−10°)=10° from the difference between the slanted angle SA of the camera unit 10 and the rotation angle RA of the remote control unit 20.

Thus, the live view image LI is the image which has been acquired and trimmed along the trimming frame 50a.

Therefore, the display section 24 of the remote control unit 20 displays the trimmed image as the live view image LI, as shown in FIG. 7A.

The trimming frame 50a of the camera unit 10 is changed according to the difference between the installation angle (the slanted angle) SA of the camera unit 10 and the rotation angle RA of the remote control unit 20.

Thus, the live view image LI is also changed according to changes in the rotation angle RA of the remote control unit 20.

The user rotates the remote control unit 20 so that the live view image LI is at a desired angle while looking at the live view image LI displayed by the display section 24 of the remote control unit 20.

For example, as shown in FIG. 7B, the user rotates the remote control unit 20 counterclockwise by 20° so that the live view image LI displayed by the remote control unit 20 is at a desired angle. In this case, the trimming frame 50a of the camera unit 10 rotates counterclockwise by 30° in real time according to the difference between the installation angle SA of the camera unit 10 (−10°) and the rotation angle RA of the remote control unit 20 (20°), i.e. 20°−(−10°)=30°.

Further, in the case that the user performs an image-taking instruction operation when the live view image LI displayed by the remote control unit 20 is a desired angle as shown in FIG. 7B, the camera unit 10 crops the captured image 60 based on the trimming frame 50a as shown in FIG. 7C and stores the cropped image as a final captured image 71 in the recording medium 16.

In the remote control unit 20, the display section 24 performs full-screen display (enlarged display) of the captured image CI received from the camera unit 10 (after reduction and/or thinning processing).

In the imaging apparatus 100 in which the camera unit 10 and the remote control unit 20 are used separately according to the above described second embodiment of the present invention, the rotation angle TA of the trimming frame 50a for trimming photography by the camera unit 10 is set in real time based on the difference between the slanted angle SA acquired from the acceleration sensor 17 of the camera unit 10 and the rotation angle RA acquired from the acceleration sensor 26 of the remote control unit 20. Thus, regardless of a state of mounting the camera unit 10 (or an installation angle of the camera unit 10) or without adjusting the state of mounting (or the installation angle), it is possible to take a picture at a desired angle simply by manipulation of the remote control unit 20.

Further, according to the above described second embodiment, the user can take an image with desired framing intuitively according to the live view image displayed by the display section 24 of the remote control unit 20 without being conscious of the trimming frame 50a because the display section 24 of the remote control unit 20 displays the image trimmed in real time by the camera unit 10 by using the trimming frame 50a which is set based on the difference between the slanted angle SA acquired from acceleration sensor 17 of the camera unit 10 and the rotation angle RA acquired from the acceleration sensor 26 of the remote control unit 20 as the live view image.

In addition, although the above described second embodiment is configured to transmit the image trimmed by the camera unit 10 as the live view image LI to the remote control unit 20, the present invention is not limited to this configuration. In some embodiments, the remote control unit 20 may generate the live view image LI by trimming the image from the camera unit 10 based on the difference between the slanted angle SA of the camera unit 10 and the rotation angle RA of the remote control unit 20.

C. Third Embodiment

Next, a third embodiment of the present invention is explained.

The first and second embodiments described above are configured to set the rotation angle TA of the trimming frame based on the rotation angle RA of the remote control unit 20, and the difference between the slanted angle SA of the camera unit 10 and the rotation angle RA of the remote control unit 20, respectively.

On the other hand, the third embodiment uses a camera unit 10 capable of wide angle photography and can set a trimming frame along which an image to be stored is cut off from a wide-angle image captured by the camera unit 10 according to a direction and an amount of translational movement of the remote control unit 20 in addition to a rotation angle of the remote control unit 20.

Figure 8:
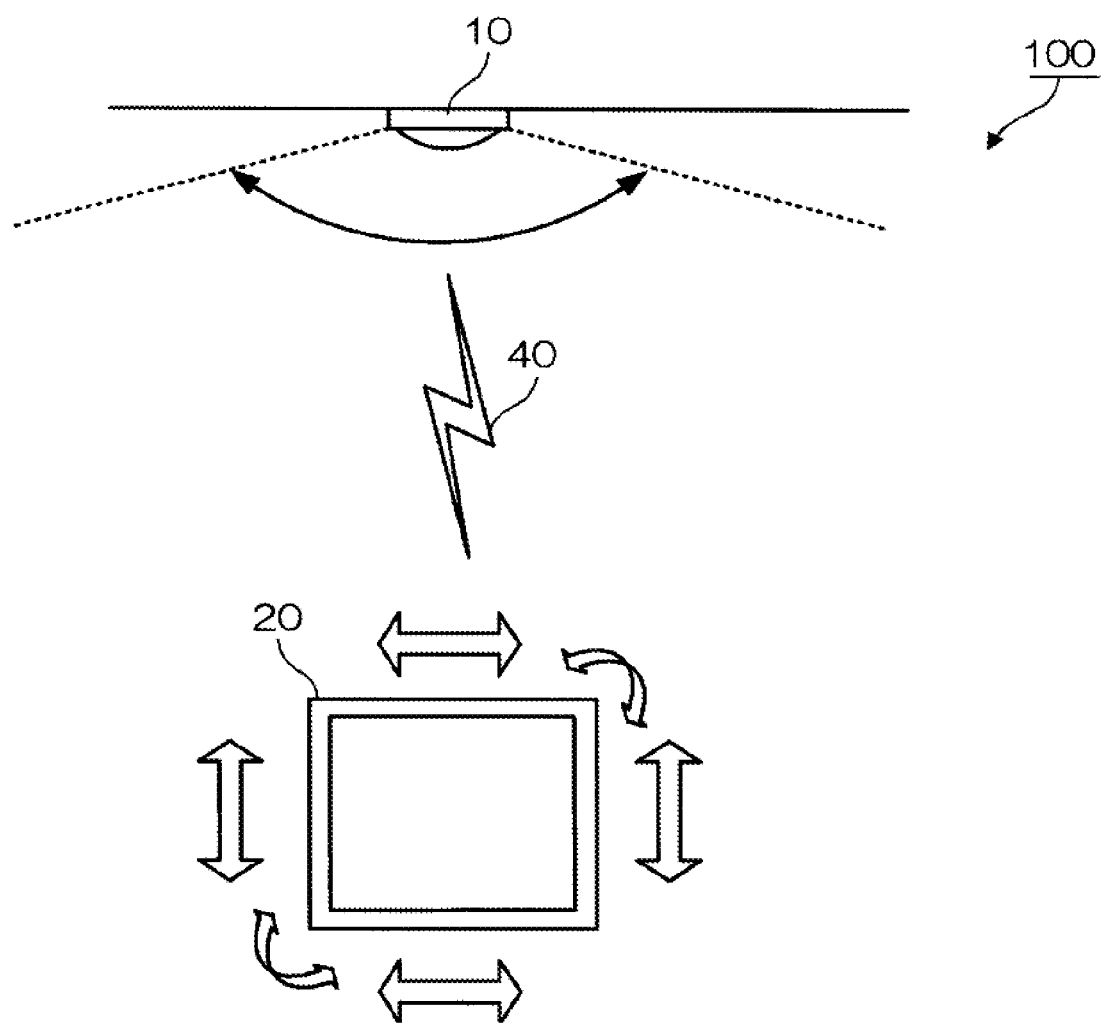
FIG. 8 is a block diagram showing a configuration of an imaging apparatus 100 according to a third embodiment of the present invention.

FIG. 8 is a block diagram showing a configuration of an imaging apparatus 100 according to the third embodiment of the present invention.

In comparison with the first embodiment, the camera unit 10 of the third embodiment includes an imaging section 14 capable of wide angle photography. Although FIG. 8 shows an example in which the camera unit 10 is installed on a ceiling of a large hall or a classroom, the embodiment is not limited to this and the camera unit 10 may be installed in an outdoor place such as a city park and an amusement park.

Further, according to the third embodiment, it is possible to set a trimming frame for cutting an image to be stored off from a wide-angle image captured by the camera unit 10 according to the direction and the amount of translational movement of the remote control unit 20 in addition to a rotation angle of the remote control unit 20 as described above.

As the configurations of the camera unit 10 and the remote control unit 20 are the same as those of FIGS. 2A and 2B, explanations of them are omitted.

Figure 9:
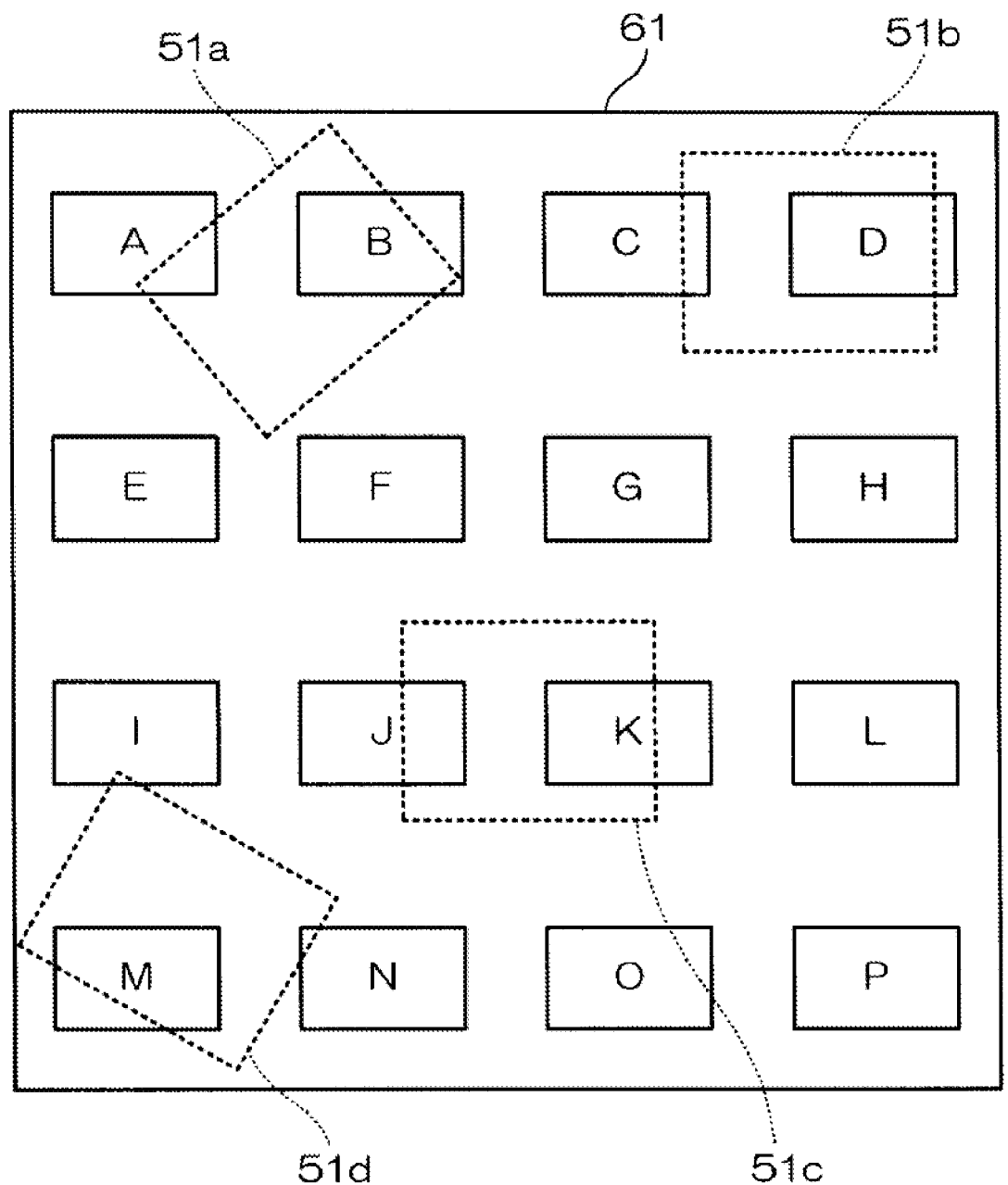
FIG. 9 illustrates an example of a wide-angle image 61 captured by a camera unit 10 and trimming frames 51a-51d which change in accordance with rotation and/or translation of a remote control unit 20 according to the third embodiment of the present invention.

FIG. 9 illustrates an example of a wide-angle image 61 captured by the camera unit 10 and trimming frames 51a-51d which change in accordance with rotation and/or translation of the remote control unit 20 according to the third embodiment of the present invention. In FIG. 9, the wide-angle image 61 captured by the camera unit 10 shows subjects A to P (for example, desks, tables, or the like). Further, trimming frames 51a-51d which change in accordance with rotation and/or translation of the remote control unit 20 are shown.

For example, an initial position of the remote control unit 20 (no rotation and no translation) is the center of the wide-angle image 61 and a rotation angle=0°.

As explained with respect to the second embodiment, in the case that the user rotates the remote control unit 20 counterclockwise 40° after moving it in the upper left direction while looking at a live view image, the trimming frame 51a is set in the camera unit 10.

In the case that the user moves the remote control unit 20 in the upper right direction without rotating it, the trimming frame 51b is set in the camera unit 10.

In the case that the user moves the remote control unit 20 slightly in the lower right direction without rotating it, the trimming frame 51c is set in the camera unit 10.

In the case that the user rotates the remote control unit 20 clockwise 30° after moving it in the lower left direction, the trimming frame 51d is set in the camera unit 10.

FIGS. 10A, 10B, 10C and 10D are schematic diagrams showing an example of live view images (or captured images) at various locations of the remote control unit 20 according to the third embodiment of the present invention.

Figure 10A:
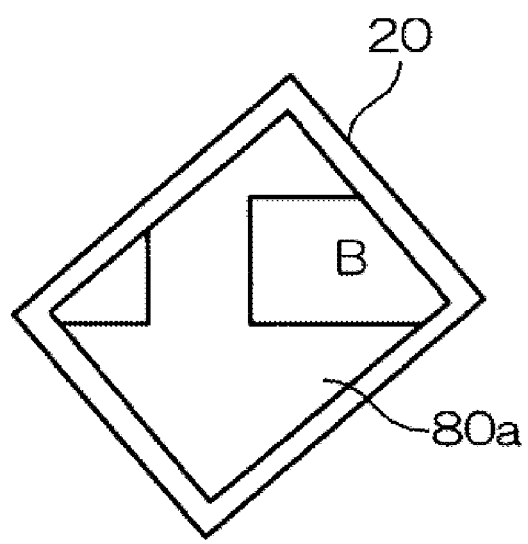
FIGS. 10A, 10B, 10C and 10D are schematic diagrams showing an example of live view images (or captured images) at various locations of the remote control unit 20 according to the third embodiment of the present invention.

In the case that the user rotates the remote control unit 20 counterclockwise 40° after moving it in the upper left direction while looking at a live view image, a live view image 80a as shown in FIG. 10A is displayed by the remote control unit 20. At that point of time, if the image-taking operation is performed by the remote control unit 20, an image corresponding to the live view image 80a is stored in the camera unit 10.

Figure 10B:
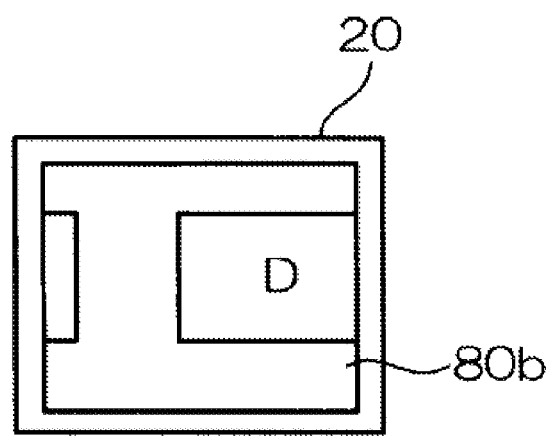

Similarly, in the case that the user moves the remote control unit 20 in the upper right direction without rotating it, a live view image 80b as shown in FIG. 10B is displayed by the remote control unit 20.

At that point of time, if the image-taking operation is performed by the remote control unit 20, an image corresponding to the live view image 80b is stored in the camera unit 10.

Figure 10C:
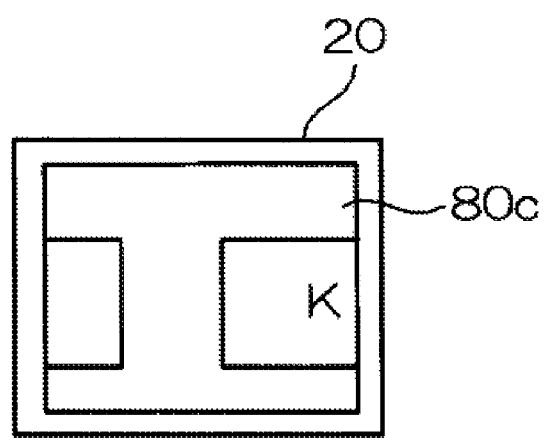

In the case that the user moves the remote control unit 20 slightly in the lower right direction without rotating it, a live view image 80c as shown in FIG. 10C is displayed by the remote control unit 20 and an image corresponding to the live view image 80c is stored in the camera unit 10.

Figure 10D:
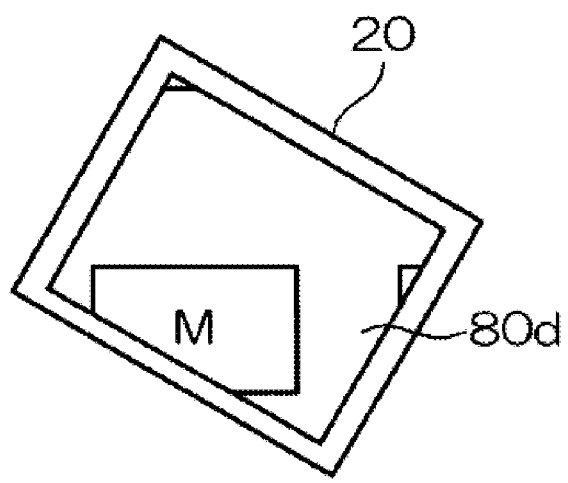

In the case that the user rotates the remote control unit 20 clockwise 30° after moving it in the lower left direction, a live view image 80d as shown in FIG. 10D is displayed by the remote control unit 20 and an image corresponding to the live view image 80d is stored in the camera unit 10.

According to the above described third embodiment, the user can take an image with desired framing simply by manipulating the remote control unit 20 regardless of a state of mounting the camera unit 10 (or an installation angle of the camera unit 10) or without adjusting the state of mounting (or the installation angle) because a trimming frame along which an image to be taken is cut off from a wide-angle image captured by the camera unit 10 is set according to translational movements of the remote control unit 20 in addition to rotation of the remote control unit 20.

Further, in the first to third embodiments of the present invention, the user's intention to perform trimming photography may be clarified by rotating and/or translating the remote control unit 20 while pressing a predetermined button.

In the first to third embodiments of the present invention, a captured image after being trimmed is stored. However, the present invention is not limited to this configuration. In another embodiment, an image captured by the imaging section 14 before being trimmed is stored, and, the slanted angle acquired from the acceleration sensor 17 of the camera unit 10 and the rotation angle acquired from the acceleration sensor 26 of the remote control unit 20 or the rotation angle of the trimming frame is stored in relation with the image.

In this case, an image can be obtained which is equivalent to that taken with desired framing by trimming the stored captured image before being trimmed based on the slanted angle acquired from the acceleration sensor 17 of the camera unit 10 and the rotation angle acquired from the acceleration sensor 26 of the remote control unit 20 or the rotation angle of the trimming frame.

Further, by storing the captured image before being trimmed, it is possible to reserve the high-definition image.

Further, in the first to third embodiments of the present invention, the camera unit 10 trims an image captured by the imaging section 14 based on the rotation angle of the remote control unit 20 and stores the trimmed image in the recording medium 16. However, the present invention is not limited to this configuration. In another embodiment, the remote control unit 20 may acquire an image captured by the camera unit 10, trim the acquired image and display the trimmed image on the display section 24.

More specifically, according to an embodiment, the CPU 18 of the camera unit 10 transmits an image captured according to an image-taking instruction from the remote control unit 20 to the remote control unit 20 via the communication section 11. The CPU 27 of the remote control unit 20 receives the captured image from the camera unit 10, trims the received captured image based on the rotation angle detected by the acceleration sensor 26, and displays it on the display section 24. Further, the trimmed captured image may be stored in the RAM 23, an outside recording medium (not shown in the drawings), or the like.

In another modified embodiment, in the case of receiving the captured image transmitted from the camera unit 10, the CPU 27 of the remote control unit 20 may trim the received captured image based on the rotation angle detected by the acceleration sensor 26 and the direction and amount of the translational movement.

The trimmed captured image may be stored in the RAM 23, an outside recording medium (not shown in the drawings), or the like.

In another modified embodiment, the CPU 27 of the remote control unit 20 receives the slanted angle of the camera unit 10 in addition to an image captured by the camera unit 10 and trims the received captured image based on the difference between the rotation angle detected by the acceleration sensor 26 and slanted angle of the camera unit 10.

The trimmed captured image may be stored in the RAM 23, an outside recording medium (not shown in the drawings), or the like.

Although the first to third embodiments are described with respect to still pictures, the present invention is not limited to this. The present invention can also be applied to cases of taking continuous shots or a moving-picture for framing at the time of starting shooting.

Further, although the camera unit 10 is installed on a stationary object in the first to third embodiments, the present invention is not limited to this. According to embodiments, the camera unit 10 may be mounted on a moving object such as a pet or a child.

In the case that the camera unit 10 is mounted on a moving object such as a pet or a child and takes continuous shots or a moving-picture as described above, the slanted angle of the camera unit 10 changes during taking an image.

In this case, when receiving an image-taking instruction from the remote control unit 20, the camera unit 10 stores the slanted angle of the camera unit 10 at that point of time as an initial slanted angle.

Based on the difference between the slanted angle of the camera unit 10 changing while taking continuous shots or a moving picture and the initial slanted angle, the camera unit 10 may correct the rotation angle of the trimming frame in real time.

As described above, it is possible to inhibit an image from drastically changing even if the slanted angle of the camera unit 10 changes while taking continuous shots or a moving picture by correcting the rotation angle of the trimming frame in real time.

Although some embodiments of the present invention have been described above, the embodiments are for illustrative purposes only and not intended to limit the technical scope of the present invention. It will be evident that there are many other possible embodiments of the present invention and various modifications such as omission or substitution may be made without departing from the spirit of the invention. These embodiments and modifications fall within the scope and the spirit of the invention described in this specification and within the scope of the invention as defined in the appended claims and equivalents thereof.

What is claimed is:

1. An imaging apparatus comprising:
a camera unit; and
a display unit, wherein the camera unit and the display unit are separate units and communicate with each other,
the display unit comprises:
  a display section;
  an acquiring section configured to acquire a rotation angle of the display unit; and
  a rotation angle transmitting section configured to transmit the rotation angle acquired by the acquiring section to the camera unit by the communication,
the camera unit comprises:
  an imaging section;
  a rotation angle receiving section configured to receive the rotation angle transmitted by the rotation angle transmitting section;
  a setting section configured to set a trimming frame for a live view image captured by the imaging section based on the rotation angle received by the rotation angle receiving section; and
  a live view image transmitting section configured to transmit the live view image based on the setting by the setting section to the display unit by the communication, and
the display unit further comprises a live view image receiving section configured to receive the live view image transmitted by the live view image transmitting section by the communication, and
a display control section configured to control the display section to display the live view image received by the live view image receiving section.

2. The imaging apparatus of claim 1, wherein the live view image includes the trimming frame superposed onto the live view image.

3. The imaging apparatus of claim 1, wherein the camera unit further comprises a slanted angle acquiring section configured to acquire a slanted angle of the camera unit, and
the setting section of the camera unit sets a trimming frame for the live view image captured by the imaging section based on the rotation angle and the slanted angle of the camera unit acquired by the slanted angle acquiring section.

4. The imaging apparatus of claim 1, wherein the display unit further comprises a movement information acquiring section configured to acquire at least one of a moving direction and a moving amount of the display unit, and the setting section of the camera unit sets a trimming frame for the live view image captured by the imaging section based on the rotation angle and the at least one of the moving direction and the moving amount acquired by the movement information acquiring section.

5. The imaging apparatus of claim 1, wherein the camera unit further comprises an instruction detecting section configured to detect an image-taking instruction, and an acquiring section configured to acquire an image taken according to the image-taking instruction detected by the instruction detecting section and information on the trimming frame set by the setting section.

6. The imaging apparatus of claim 1, wherein the camera unit further comprises an instruction detecting section configured to detect an image-taking instruction, and a storage control section configured to perform controls to trim an image taken according to the image-taking instruction detected by the instruction detecting section along the trimming frame set by the setting section and store the trimmed image.

7. A camera unit comprises:
an imaging section;
a communication section;
a rotation angle receiving section configured to receive a rotation angle from the outside via the communication section;
a setting section configured to set a trimming frame for a live view image captured by the imaging section based on the rotation angle received by the rotation angle receiving section; and
a live view image transmitting section configured to transmit the live view image based on the setting by the setting section to the outside via the communication section.

8. The camera unit of claim 7, wherein the live view image includes the trimming frame superposed onto the live view image.

9. The camera unit of claim 7, further comprising a slanted angle acquiring section configured to acquire a slanted angle of the camera unit, wherein the setting section sets a trimming frame for the live view image captured by the imaging section based on the rotation angle and the slanted angle of the camera unit acquired by the slanted angle acquiring section.

10. The camera unit of claim 7, further comprising a movement information acquiring section configured to acquire at least one of a moving direction and a moving amount of a recipient of the live view image via the communication section, wherein the setting section sets a trimming frame for the live view image captured by the imaging section based on the rotation angle and the at least one of the moving direction and the moving amount acquired by the movement information acquiring section.

11. The camera unit of claim 7, further comprising an instruction detecting section configured to detect an image-taking instruction, and an acquiring section configured to acquire an image taken according to the image-taking instruction detected by the instruction detecting section and information on the trimming frame set by the setting section.

12. The camera unit of claim 7, further comprising an instruction detecting section configured to detect an image-taking instruction, and a storage control section configured to perform controls to trim an image taken according to the image-taking instruction detected by the instruction detecting section along the trimming frame set by the setting section and store the trimmed image.

13. A display unit comprising:
a display section;
an acquiring section configured to acquire a rotation angle of the display unit;
a communication section;
a rotation angle transmitting section configured to transmit the rotation angle acquired by the acquiring section to an external camera unit via the communication section;
a live view image receiving section configured to receive a live view image which is transmitted from the external camera unit and based on a result of setting a trimming frame based on the rotation angle via the communication section; and
a display control section configured to control the display section to display the live view image received by the live view image receiving section.

14. The display unit of claim 13, wherein the live view image includes the trimming frame superposed onto the live view image.

15. The display unit of claim 13, further comprising an image-taking instruction detecting section configured to detect an image-taking instruction;

an image-taking instruction transmitting section configured to transmit the image-taking instruction detected by the image-taking instruction detecting section to the external camera unit via the communication section;
a taken image receiving section configured to receive an image based on a result of trimming along the trimming frame via the communication section in response to the image-taking instruction transmitted by the image-taking instruction transmitting section; and
a taken image display control section configured to control the display section to display the image received by the taken image receiving section.

16. An imaging method comprising:
a rotation angle receiving step of receiving a rotation angle transmitted from the outside via a communication section;
a setting step of setting a trimming frame for a live view image captured by an imaging section based on the rotation angle received at the rotation angle receiving step; and
a live view image transmitting step of transmitting the live view image based on the setting at the setting step to the outside via the communication section.

17. A display method comprising:
an acquiring step of acquiring a rotation angle of a display unit;
a rotation angle transmitting step of transmitting the rotation angle acquired at the acquiring step to an external camera unit via a communication section;
a live view image receiving step of receiving a live view image which is transmitted from the external camera unit and based on a result of setting a trimming frame based on the rotation angle via the communication section; and a display control step of controlling a display section to display the live view image received at the live view image receiving step.

18. A non-transitory computer-readable recording medium for recording a program readable by a computer including an imaging section and a communication section, the program controlling the computer to function as:

a rotation angle receiving section configured to receive a rotation angle from the outside via the communication section;

a setting section configured to set a trimming frame for a live view image captured by the imaging section based on the rotation angle received by the rotation angle receiving section; and a live view image transmitting section configured to transmit the live view image based on the setting by the setting section to the outside via the communication section.

19. A non-transitory computer-readable recording medium for recording a program readable by a computer including a display section and a communication section, the program controlling the computer to function as:

an acquiring section configured to acquire a rotation angle thereof;

a rotation angle transmitting section configured to transmit the rotation angle acquired by the acquiring section to an external camera unit via the communication section;

a live view image receiving section configured to receive a live view image which is transmitted from the external camera unit and based on a result of setting a trimming frame based on the rotation angle via the communication section; and a display control section configured to control the display section to display the live view image received by the live view image receiving section.

* * * * *